US008636091B2

(12) United States Patent
Sanji et al.

(10) Patent No.: US 8,636,091 B2
(45) Date of Patent: Jan. 28, 2014

(54) HYBRID DRIVE DEVICE

(75) Inventors: Hiroaki Sanji, Anjo (JP); Nobukazu Ike, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 1231 days.

(21) Appl. No.: 12/252,755

(22) Filed: Oct. 16, 2008

(65) Prior Publication Data

US 2009/0100965 A1    Apr. 23, 2009

(30) Foreign Application Priority Data

Oct. 19, 2007 (JP) ................................. 2007-272814

(51) Int. Cl.
  *B60K 6/445* (2007.10)
  *B60K 6/442* (2007.10)

(52) U.S. Cl.
  USPC ..................... 180/65.235; 180/65.23; 475/3

(58) Field of Classification Search
  USPC ........ 180/65.21, 65.22, 65.25, 65.225, 65.23, 180/65.235; 475/5; 477/3
  See application file for complete search history.

(56) References Cited

U.S. PATENT DOCUMENTS

| | | | |
|---|---|---|---|
| 5,482,512 A * | 1/1996 | Stevenson | 475/5 |
| 6,155,364 A | 12/2000 | Nagano et al. | |
| 6,176,808 B1 * | 1/2001 | Brown et al. | 477/5 |
| 6,306,057 B1 * | 10/2001 | Morisawa et al. | 475/5 |
| 6,336,888 B1 * | 1/2002 | Eguchi | 477/3 |
| 6,340,339 B1 | 1/2002 | Tabata et al. | |
| 6,524,216 B2 * | 2/2003 | Suzuki et al. | 477/3 |
| 6,863,140 B2 * | 3/2005 | Noreikat et al. | 180/65.23 |
| 6,966,867 B2 * | 11/2005 | Tajima et al. | 477/7 |
| 7,017,693 B2 * | 3/2006 | Omote et al. | 180/65.26 |
| 7,326,140 B2 * | 2/2008 | Kim et al. | 475/5 |
| 7,489,114 B2 * | 2/2009 | Nomura et al. | 322/33 |
| 7,582,980 B2 * | 9/2009 | Motoike et al. | 290/40 C |
| 7,651,425 B2 * | 1/2010 | Shimizu | 475/5 |
| 7,727,099 B2 * | 6/2010 | Kasuya et al. | 475/5 |
| 7,766,778 B2 * | 8/2010 | Tabata et al. | 475/5 |
| 7,891,449 B2 * | 2/2011 | Sanji | 180/65.235 |
| 7,900,763 B2 * | 3/2011 | Paumier et al. | 192/85.51 |

(Continued)

FOREIGN PATENT DOCUMENTS

CN  101018687 A  8/2007
DE  698 03 484 T2  11/2002

(Continued)

OTHER PUBLICATIONS

Translation of German Office Action issued in German Application No. 11 2008 001 344.6 dated Mar. 26, 2012.

(Continued)

*Primary Examiner* — John R Olszewski
(74) *Attorney, Agent, or Firm* — Sughrue Mion, PLLC (57) ABSTRACT

A hybrid drive device including a drive device input shaft coupled to an engine, a rotary electrical machine, a transmission shifting and outputting rotary drive transferred from the rotary electrical machine or the drive device input shaft or the both of them, a transmission case accommodating the transmission, and a rotary electrical machine case having a joint surface joining with the transmission case, a step portion with a diameter which is reduced when seen from an input shaft input end side is provided in an inner peripheral portion of the rotary electrical machine case, and a partition wall supporting the rotary electrical machine from the input shaft input end side is fixed to the step portion.

19 Claims, 4 Drawing Sheets

(56) References Cited

U.S. PATENT DOCUMENTS

| | | |
|---|---|---|
| 7,992,661 B2 * | 8/2011 | Nomura et al. ............. 180/65.21 |
| 2001/0024994 A1 * | 9/2001 | Sugano .............................. 477/2 |
| 2001/0024995 A1 * | 9/2001 | Sugano .............................. 477/2 |
| 2001/0024997 A1 * | 9/2001 | Sugano et al. .................... 477/2 |
| 2003/0106729 A1 * | 6/2003 | Noreikat et al. ............. 180/65.7 |
| 2005/0037883 A1 * | 2/2005 | Motoike et al. ................... 475/5 |
| 2006/0287150 A1 * | 12/2006 | Kim et al. ......................... 475/5 |
| 2006/0289209 A1 | 12/2006 | Grosspietsch et al. |
| 2007/0049445 A1 | 3/2007 | Reisch et al. |
| 2007/0129197 A1 * | 6/2007 | Youn et al. ....................... 475/5 |
| 2008/0093135 A1 | 4/2008 | Nomura et al. |
| 2008/0099258 A1 * | 5/2008 | Berhan ........................ 180/65.2 |
| 2008/0121446 A1 | 5/2008 | Sanji |
| 2008/0173484 A1 * | 7/2008 | Umemura et al. ........... 180/65.2 |
| 2009/0000896 A1 * | 1/2009 | Knowles ...................... 192/48.1 |
| 2009/0023529 A1 * | 1/2009 | Sanji et al. ........................ 475/5 |

FOREIGN PATENT DOCUMENTS

| | | |
|---|---|---|
| DE | 11 2007 001 756 T5 | 1/2010 |
| JP | 09-226392 A | 9/1997 |
| JP | 2000-094972 A | 4/2000 |
| JP | 2000-224797 A | 8/2000 |
| JP | 2002-137640 A | 5/2002 |
| JP | 2003-072404 A | 3/2003 |
| JP | 2004-001708 A | 1/2004 |
| JP | 2007-062726 A | 3/2007 |
| JP | 2007-174783 A | 7/2007 |
| WO | 99/22955 A1 | 5/1999 |
| WO | 2006/054661 A1 | 5/2006 |

OTHER PUBLICATIONS

Translation of Chinese Office Action issue in Chinese Application No. 200880016179.2 dated May 3, 2012 (4 pages).

* cited by examiner

HYBRID DRIVE DEVICE

INCORPORATION BY REFERENCE

This Application claims priority from Japanese Patent Application No. 2007-272814, filed on Oct. 19, 2007, the disclosure of which, including the specification, drawings and abstract, is incorporated herein by reference in its entirety.

BACKGROUND OF THE INVENTION

1. Field of the Invention

The present invention relates to a hybrid drive device which includes as drive sources an engine (for example, an internal combustion engine such as a gasoline engine, a diesel engine, or the like) and a rotary electrical machine (including, for example, a motor which receives supply of power to generate driving force (for example, rotational driving force), a generator which receives a supplied driving force to generate power, or a machine that works as a motor or generator selectively according to the operation state), and is structured to obtain driving force from one or both of the engine and the rotary electrical machine, shift the driving force with a transmission and transfer the shifted driving force to driving wheels.

2. Description of the Related Art

The applicants have introduced a hybrid drive device described in Japanese Patent Application Publication No. JP-A-2004-001708. An object of the technology disclosed in JP-A-2004-001708 is to provide a hybrid vehicle drive device having a structure in which, although an engine and a motor are coupled to be a drive source, the dimension in an axial direction is reduced further as compared to conventional devices and the dimension in a radial direction is not increased.

The hybrid vehicle drive device described in Japanese Patent Application Publication No. JP-A-2004-001708 includes an annular motor positioned about the axis of an engine output shaft, a starting device transferring driving force from the engine and the motor to a downstream transfer side, and a transmission to which the driving force from the engine and the motor is transferred via the starting device. In this drive device, the starting device includes a starting clutch and a damper device, which are formed in an annular shape about the aforementioned axis and arranged separate from each other by a predetermined distance in the axial direction, and the starting clutch is arranged so that at least a part thereof overlaps with the motor in the axial direction and is positioned on a more inside diameter side than the damper device. Japanese Patent Application Publication No. JP-A-2004-001708 shows an example of a hybrid drive device that can achieve the above object.

However, the support structure for the rotary electrical machine described above has a problem. In Japanese Patent Application Publication No. JP-A-2004-001708, a rotary electrical machine case, which is formed in a cylindrical shape and which accommodates the rotary electrical machine, is divided into two members. A partition wall is provided on the engine side case member, and a rotary electrical machine is provided on an inner peripheral portion of the transmission side case member. Therefore, in this structure, the divided case members are coupled via abutting faces thereof, and in the coupled state, the case members are coupled to the engine via a rear side thereof. Thus, they must also support the transmission as well, which requires high strength at the opening coupling portions of the two case members. Thus, large coupling portions are required. Although not specifically shown in JP-A-2004-001708, there arises a need to provide flanges to couple the case members together with bolts.

However, when adopting such a structure, the rotary electrical machine case itself consists of a plurality of members, which causes the shape of a case exterior to become complicated, and the size of the device becomes large at the same time, which is unfavorable.

SUMMARY OF THE INVENTION

Accordingly, an object of the present invention is to obtain a hybrid drive device in which a transmission is supported by a rotary electrical machine case provided on an engine side, and by which the rotary electrical machine case, as well as the entire device, can have a relatively simple exterior shape and can be made compactly.

To achieve the above object, a hybrid drive device including a drive device input shaft coupled to an engine, a rotary electrical machine, a transmission shifting and outputting rotary drive transferred from the rotary electrical machine or the drive device input shaft or the both of them, a transmission case accommodating the transmission, and a rotary electrical machine case having a joint surface joining with the transmission case, is structurally characterized in that a step portion having a reduced with a diameter when seen from an input shaft input end side is provided in an inner peripheral portion of the rotary electrical machine case, and a partition wall through which the drive device input shaft penetrates is to the step portion, the partition wall supporting the rotary electrical machine from the input shaft input end side.

Here, "coupled" refers to a state that mutual transfer of driving force is possible between members which are objects to be coupled, and includes, besides a state that both the members are coupled directly, a state that they are coupled indirectly via another member.

The hybrid drive device with this structure has the partition wall accommodated in the rotary electrical machine case, and supports the rotary electrical machine from the partition wall. Therefore, a partition wall/rotary electrical machine structure, in which the partition wall and the rotary electrical machine are substantially combined into a unit, can be inserted into the rotary electrical machine case from an opening in the input shaft input end side of the rotary electrical machine to be assembled therewith.

Further, since the structure can be fixed to the step portion provided in the case, structural factors that can easily lead to enlargement and/or complication in shape, such as providing a flange portion for coupling on a case exterior, can be eliminated by attaching this partition wall/rotary electrical machine structure to the rotary electrical machine case. Further, oil contents such as operating oil, lubricating oil, and/or the like circulate to some degree in the rotary electrical machine case, but it is possible to prevent leakage of these oil contents through the input shaft input end side over the partition wall, by an abutting face of the partition wall on the step portion. Thus, a certain degree of sealing property can be secured. Further, it is not necessary to divide the rotary electrical machine case in two as in a conventional structure, which allows a reduction in the number of parts.

Now, in the structure described above, in which the partition wall is abutted on the step portion to fix the partition wall, it is preferable that a stator of the rotary electrical machine is fixed to the partition wall, and the partition wall has a cylindrical portion covering the stator from an outer peripheral side and engaging with an inner surface of the rotary electrical machine case.

By fixing the stator of the rotary electrical machine on the partition wall, the partition wall and the stator of the rotary electrical machine can be integrated. Further, in a structure described in this application, the partition wall abuts on the rotary electrical machine case at the step portion. A partition wall is provided with a cylindrical portion, and this cylindrical portion is structured to cover the stator on its inside diameter side and internally engage it with the rotary electrical machine case. Thus, the cylindrical portion extending in the axial direction can be used to easily realize positioning of the stator and securing of oil tightness in spaces sandwiching the partition wall.

To provide a partition wall having such a cylindrical portion, it is also preferable that the cylindrical portion is structured such that a part is shorter in a circumferential direction than in an axial direction.

The hybrid drive device according to this application is particularly desired to be compact, and thus it is not favorable to provide a cylindrical portion larger than necessary, not only in the axial direction but also in the radial direction. Accordingly, for example, by making a part thereof short in the circumferential direction about the axis (also including a portion where the cylindrical portion is not formed completely when seen in a cross-section), an object to obtain a compact hybrid drive device can be achieved, while realizing the function as the cylindrical portion. As such a portion in the circumferential direction, there can be exemplified an upper portion where a problem of oil leakage or the like can easily occur, a disposing portion for a differential gear, which requires a relatively large space, and the like.

Here, in the structure including the partition wall as explained hitherto, it is preferable that an oil tight space is formed by the case and the partition wall, on a side nearer the transmission side than the partition wall, and a cooling oil supply mechanism supplying oil to cool the rotary electrical machine is provided therein.

In the hybrid drive device according to this application, oil circulates in a space on a side nearer the transmission side than the partition wall (where at least the rotary electrical machine and the transmission are disposed), and the space can be made oil tight to assure sealing. Then, by providing the cooling oil supply mechanism, cooling of the rotary electrical machine can be easily realized using cooled oil.

To construct a hybrid drive device as has been explained above, it is preferable that it includes a transmission input shaft concentric with the drive device input shaft, a counter shaft receiving transmission output and having an axial center different from the transmission input shaft, and a differential gear receiving output from the counter shaft, in which the differential gear is structured to be supported by both the transmission case and the rotary electrical machine case, which constitutes the case.

In this structure, a first axial center about which the drive device input shaft and the transmission input shaft are disposed concentrically, a second axial center about which the counter shaft is disposed, and a third axial center about which an axle to which drive is transferred via the differential gear, is disposed can be provided different from each other, to thereby make the device length in the axial direction short. Then the differential gear can be supported by the transmission case and the rotary electrical machine case to thereby obtain a drive device, which can be assembled easily, with a small number of parts.

Now, in the hybrid drive device as explained hitherto, it is preferable that a rotor support member supporting a rotor of the rotary electrical machine is structured including:

an input shaft side radially extending part having an inside diameter side portion rotatably supported by the drive device input shaft and extending in a radial direction;

an intermediate shaft side radially extending part having an inside diameter side portion coupled to a transmission input shaft as an intermediate shaft and extending in a radial direction; and a coupling part coupling outside diameter sides of the input shaft side radially extending part and the intermediate shaft side radially extending part in an axial direction, in which laminates constituting the rotor are provided on an outside diameter portion of the coupling part.

In this structure, the rotor is supported from the side by the drive device input shaft and the intermediate shaft, which are disposed concentrically, said rotor being supported by a rotor support member comprising the input shaft side radially extending part and the intermediate shaft side radially extending part. In this structure, a space can be provided between the both extending parts in an inside diameter side portion of this rotor which normally has a large diameter.

Specifically, for example, a clutch drum coupled to the drive device input shaft enters a space surrounded by the input shaft side radially extending part, the intermediate shaft side radially extending part and the coupling part, wherein the intermediate shaft side radially extending part is structured as a clutch hub, and a friction plate and a piston are disposed between the clutch drum and the clutch hub so as to form a clutch which engages/disengages drive transfer from the drive device input shaft to the transmission. With this structure, a device short in the axial direction, which includes a clutch, can be easily realized in the hybrid drive device according.

Further, by adopting a structure in which a fixing member different from the partition wall is provided on a side of the drive device input shaft nearer the output end, than the partition wall, and the rotor support member is supported at one side by a first rotary bearing fixed to the partition wall, and supported at another side by a rotary shaft bearing provided between the rotor support member and the fixing member, the rotor support member as well as the rotor can be supported securely and stably.

Further, by including a damper for absorbing rotary vibration of the engine and for transferring motive power to the drive device input shaft, and by disposing an outside diameter side portion of the partition wall accommodating a part (input end side of the drive device input shaft) of the rotary electrical machine at an outside diameter side position overlapping with a part of an inside diameter side portion of the damper in an axial direction, the axial direction length of the damper, rotary electrical machine, and partition wall can be reduced.

The above structure is a described as on the input shaft input end side (engine side) of the rotary electrical machine, but a similar arrangement can be made on the output end side (transmission side).

Specifically, by disposing a part (output end side of the drive device input shaft) of the rotary electrical machine at an outside diameter side position overlapping with the above-described clutch in an axial direction, the length in the axial direction can be similarly reduced.

Exemplary embodiments of the present application may have the above discussed identified advantages. However, embodiments of the present application need not have the above identified advantages or any advantages at all.

DETAILED DESCRIPTION OF THE EXEMPLARY EMBODIMENTS

Hereinafter, an exemplary embodiment regarding a hybrid drive device HV according to this application will be explained based on the drawings.

Figure 1:
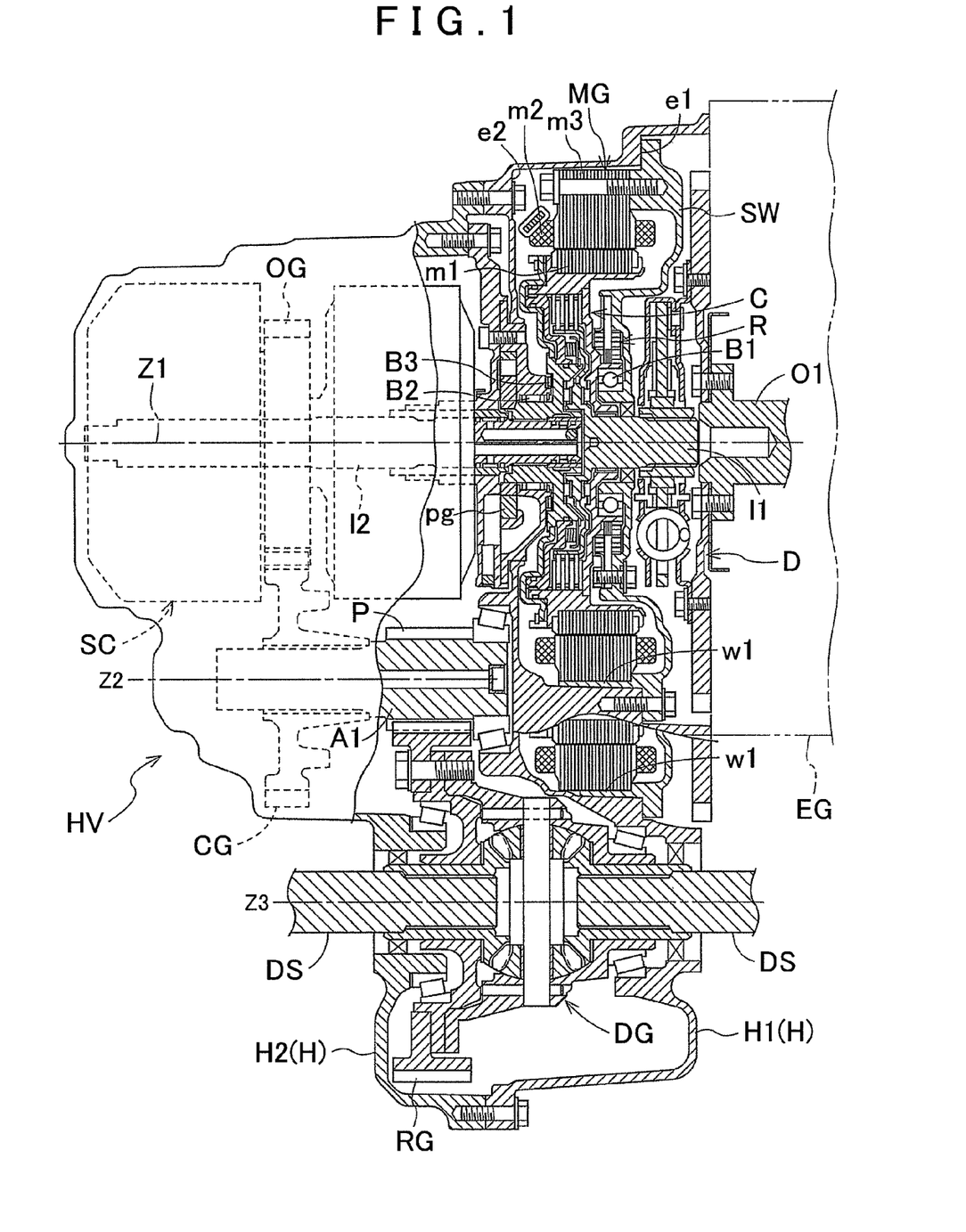
FIG. 1 is a cross-sectional view showing a structure of a hybrid drive device according to an exemplary embodiment of this application.
Figure 2:
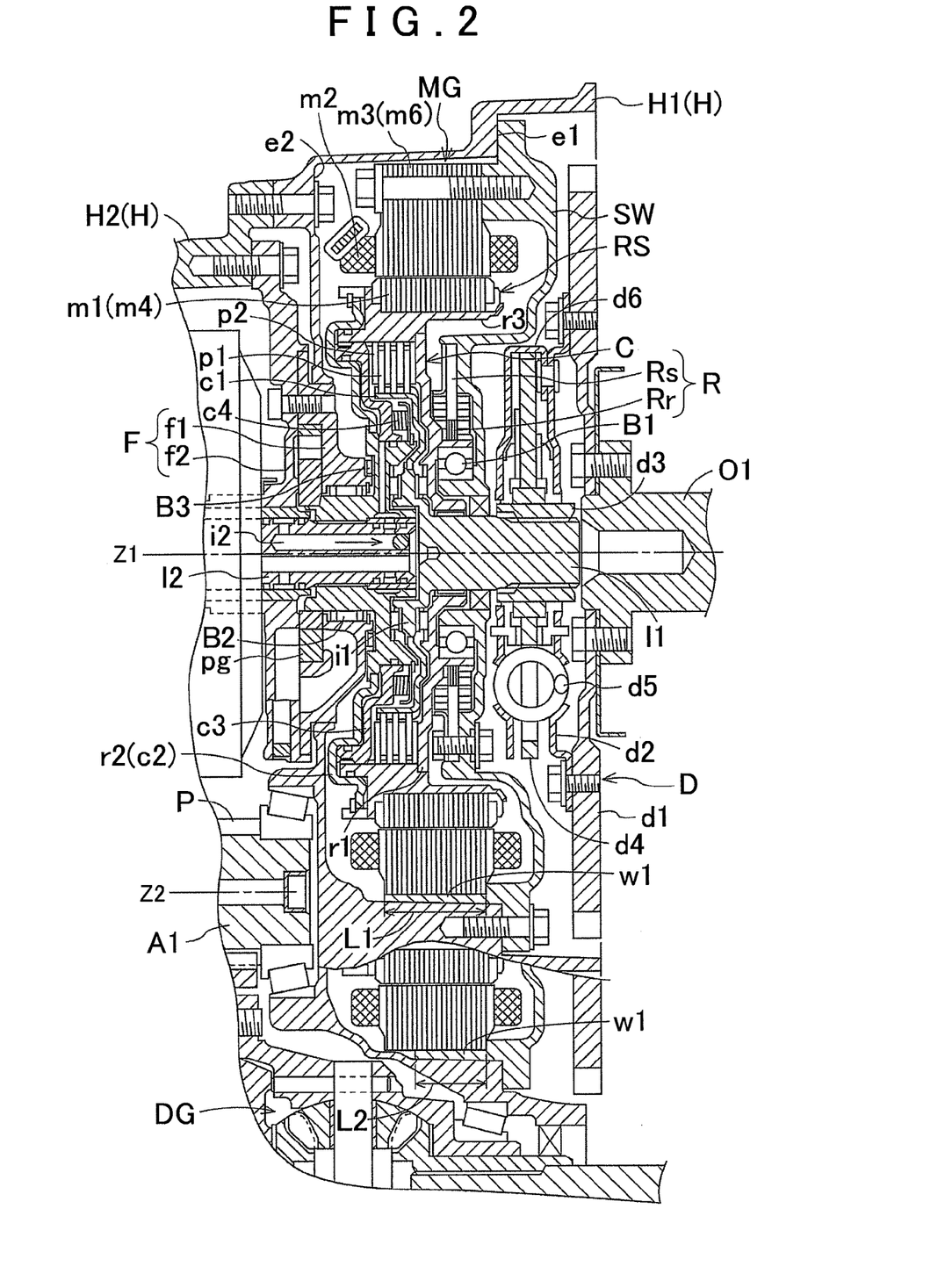
FIG. 2 is a cross-sectional view showing a main structure of the hybrid drive device according to an exemplary embodiment of this application.
Figure 3:
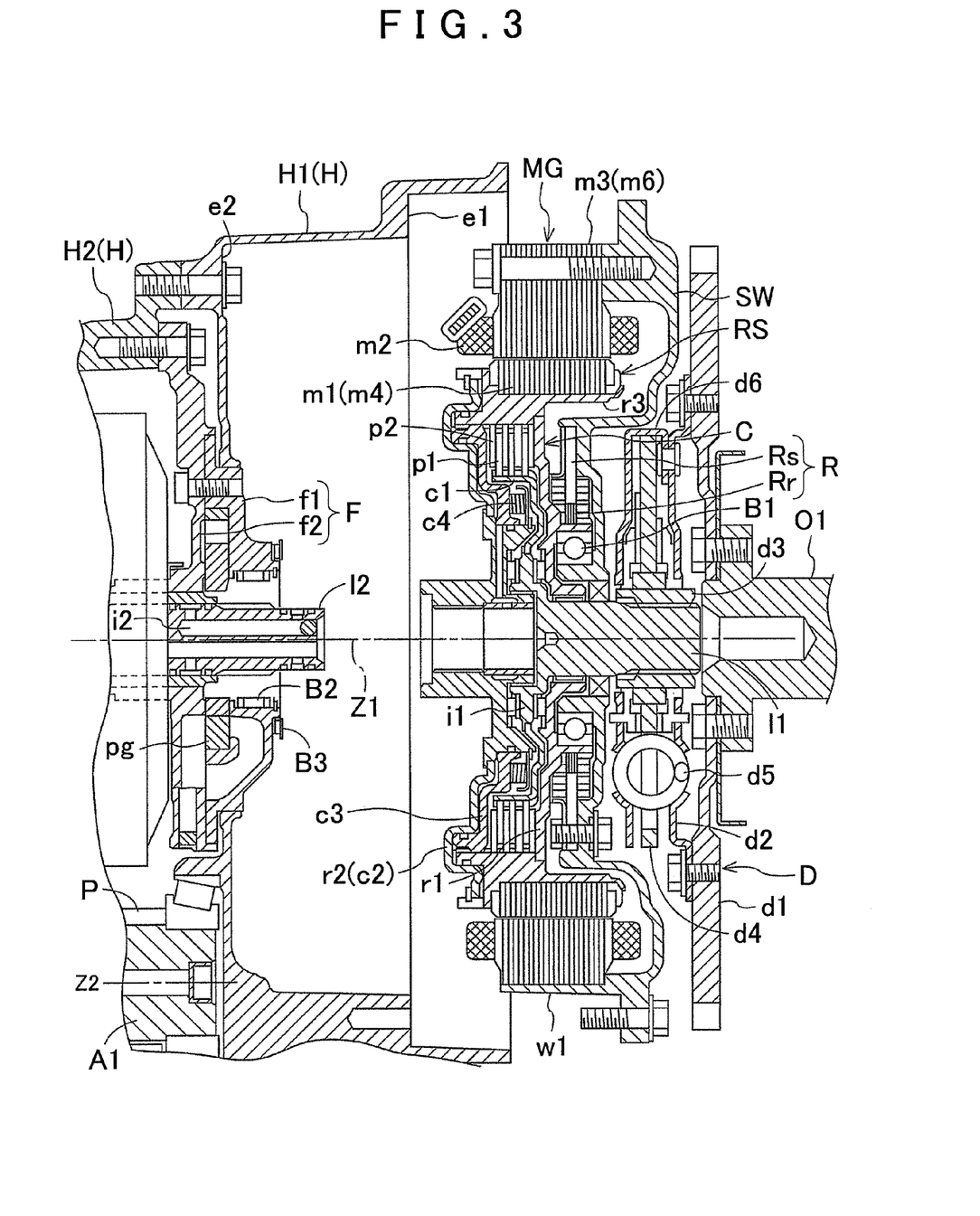
FIG. 3 is a cross-sectional view showing a state of assembling operation of the hybrid drive device according to an exemplary embodiment of this application.
Figure 4:
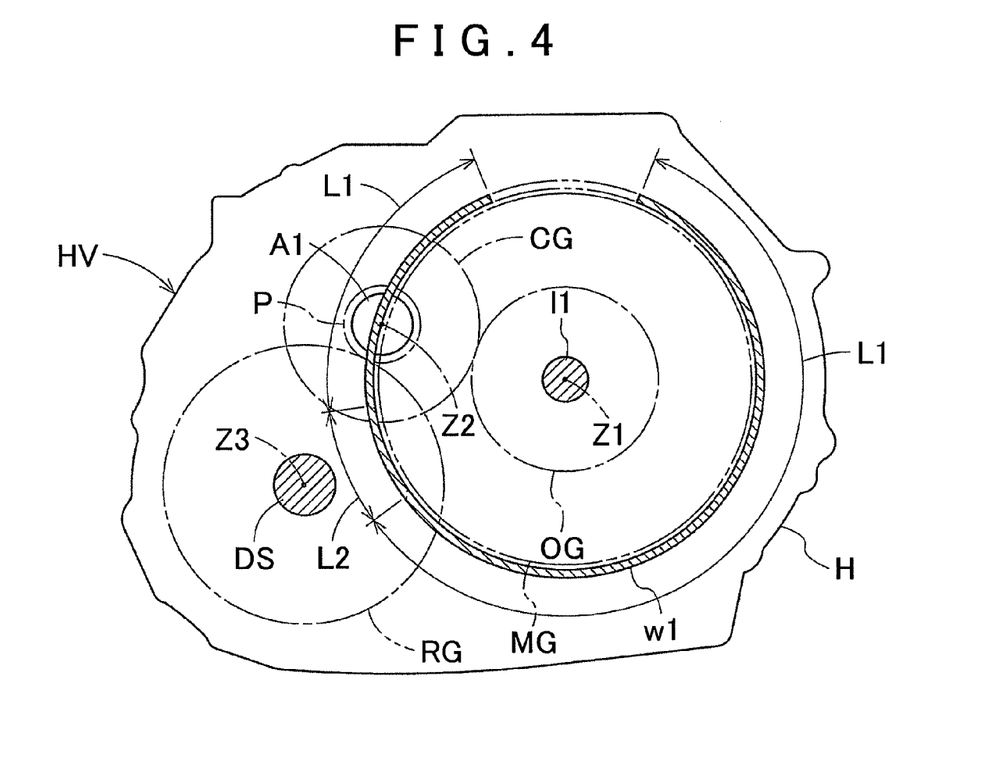
FIG. 4 is a side view showing an arrangement of main devices of the hybrid drive device according to an exemplary embodiment of this application.
Figure 5:
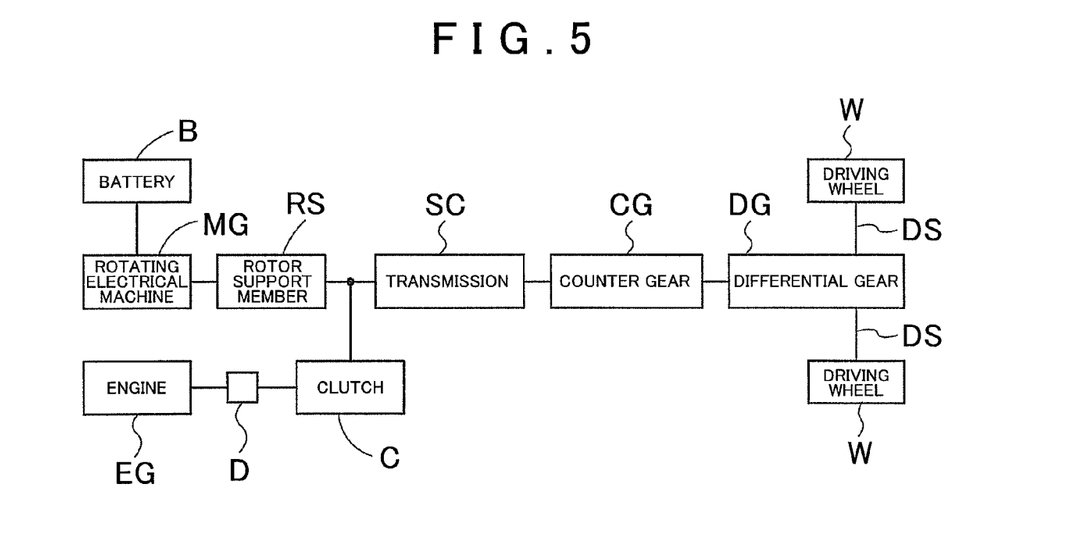
FIG. 5 is a diagram showing an outline of a drive transfer system of the hybrid drive device according to an exemplary embodiment of this application.

FIG. 1, FIG. 2 are cross-sectional views showing a structure of the hybrid drive device HV, FIG. 3 is an explanatory view showing a state of assembling operation of the hybrid drive device HV, FIG. 4 is a view showing an arrangement structure of main devices viewed in an axial direction, and FIG. 5 is a schematic view of a drive transfer system adopted in this hybrid drive device HV.

A vehicle including this hybrid drive device HV has an engine EG and a rotary electrical machine MG as drive sources, and the vehicle shifts rotary drive obtained therefrom with a transmission SC, and transfers shifted output to driving wheels W via a counter gear CG and a differential gear DG so as to travel.

As shown schematically, in FIG. 5, the rotary electrical machine MG is drive-coupled to the transmission SC, and the engine EG is drive-coupled to the transmission SC via a damper D and a clutch C. Therefore, in this drive transfer system, in a non-coupled state of the clutch C, the rotary electrical machine MG is structured to work as a motor to enable motor traveling, and during braking, the rotary electrical machine MG can work as a generator to charge a battery B connected electrically to the rotary electrical machine MG On the other hand, in a coupled state of the clutch C, driving force from the rotary electrical machine MG and the engine EG is transferred to the transmission SC, and thereby driving force can be obtained from both of the drive sources to travel.

FIG. 1 is a view showing details of the hybrid drive device HV according to this application, and showing the arrangement and connection relationship of the engine EG, the rotary electrical machine MG, a drive device input shaft I1, the clutch C, the transmission SC, a counter shaft A1 on which the counter gear CG is provided, and the differential gear DG FIG. 2 is a view showing a detailed structure around the rotary electrical machine MG and the drive device input shaft I1.

The hybrid drive device HV is structured including the drive device input shaft I1 drive-coupled to the engine EG via the damper D, the rotary electrical machine MG provided concentrically with the drive device input shaft I1, the transmission SC, the counter shaft A1 provided in an axial center position different from the drive device input shaft I1, and the differential gear DG.

A case H of this hybrid drive device HV is structured including a rotary electrical machine case H1 that is disposed on a device rear side (engine side, which is the right side in FIG. 1) for accommodating the damper D, the rotary electrical machine MG, the clutch C, and a transmission case H2 disposed on a device front side (left side in FIG. 1) for accommodating the transmission SC. In this example, as shown in the drawings, the rotary electrical machine case H1 is coupled by bolts to the engine side of the transmission case H2.

In a state that the rotary electrical machine case H1 and the transmission case H2 are both coupled, a space formed in the case H is divided from the engine side into a first space accommodating the damper D, a second space accommodating the rotary electrical machine MG and the clutch C, and a third space accommodating the transmission SC, and a partition wall SW and a fixing member F for dividing these spaces are provided therein.

As can be seen from FIG. 1 and FIG. 2, for the partition wall SW, there is adopted a structure that can be inserted from an engine side opening of the rotary electrical machine case H1, and this partition wall SW is structured to be fixed by bolts on a step portion e1 provided on an inner peripheral surface of the rotary electrical machine case H1 from a side of the engine side opening. Specifically, for the rotary electrical machine case H1, there is adopted a structure having a cross-sectional opening area that becomes narrower with distance toward a transmission side, and for the partition wall SW, there is adopted a structure to abut on the first step portion e1 provided on an engine side of the rotary electrical machine case H1 to be fixed by bolts on this step portion e1. To this partition wall SW, a stator m3 of the rotary electrical machine MG is fixed, and by a first rotary shaft bearing B1, which will be described later, a rotor m1 of the rotary electrical machine MG having a structure unique to this application is supported from the engine side. Further, the drive device input shaft I1 penetrates through this partition wall SW, and by this partition wall SW the drive device input shaft I1 is partitioned into an input end side (engine side) and an output end side (transmission side).

This partition wall SW has a structure to support the rotary electrical machine MG and the clutch C having a portion provided integrally with a rotor support member RS of the rotor m1. This partition wall SW is provided with a cylindrical portion w1 extending toward the transmission side in the axial direction from an abutting surface to abut on the step portion e1. For this cylindrical portion w1, there is adopted a structure covering the stator m3 from an outer peripheral side and further engaging with an inner surface of the rotary electrical machine case. Adopting such a structure, the rotary electrical machine case H1 and the partition wall SW abut on each other via an outer peripheral surface of the cylindrical portion w1 provided on the transmission side in the axial direction, or via the abutting surface with respect to the step portion e1 provided on the engine side in a radial direction, or via both of them, and are thereby structured to be able to highly maintain oil tightness in the second space in which the rotary electrical machine MG is accommodated.

However, as shown in FIG. 2 and FIG. 4, this cylindrical portion w1 is structured such that a portion thereof is not formed completely in a circumferential direction thereof, or an extension length toward the transmission side is short. In the shown example, it is not formed completely in an upper portion, and in a disposing portion for the differential gear DG shown by L2 with respect to L1 in FIG. 2, the length thereof is formed short. Thus, it is structured so that a disposing side of the differential gear DG does not become large.

Further, the rotary electrical machine case H1 is provided with a step portion e2 for coupling a case on a more transmission side than the step portion e1 to which the partition wall SW is fixed, and it forming a structure in which this step portion e2 is used to couple and fix the rotary electrical machine case H1 and the transmission case H2 by bolts.

As can be seen from the FIG. 1 and FIG. 2, the fixing member F is attached to the engine side opening of the transmission case H2 and fixed thereon. This fixing member F is structured such that a pair of members f1, f2 are coupled integrally by bolts to form a pump body that forms a pump chamber inside.

Then, there is adopted a structure such that one of the pump body forming members f1, f2 (pump body forming member f1 on a drive device input shaft side), which are a pair of members, is inserted into the transmission side opening of the rotary electrical machine case H1. In the pump chamber, there is disposed a pump gear pg rotating integrally with a clutch hub c2, which will be described later. Through this pump body forming member f1 on drive device input shaft side, the transmission input shaft I2 is penetrated on an axial center side thereof.

Therefore, in the hybrid drive device HV of this application, a predetermined oil pressure can be obtained by rotation of the rotary electrical machine MG.

Now, as is clear from FIG. 2, the other of the pump body forming members (pump body forming member f2 on the transmission side) is fixed at an outside diameter side portion thereof (rotary electrical machine disposing side portion) on the case H (specifically, the transmission case H2) by bolts.

The above is the outline of the hybrid drive device HV according to an exemplary embodiment of this application. Hereinafter, detailed explanation will be given from the side of the drive device input shaft I1.

Damper

The damper D is structured including a drive plate d1 coupled to a crank shaft that is an engine output shaft O1, a first driven plate d2 coupled to a position in the vicinity of an outside diameter end of the drive plate d1, and a second driven plate d4 coupled to the drive device input shaft I1 via a boss part d3. The first driven plate d2 has a bifurcated part d6 having a downward U-shape cross-section in an inside diameter side portion, and is structured so that the second driven plate d4 enters the bifurcated part d6. Then, a plurality of damper springs d5 are attached evenly and dispersively in a circumferential direction between the bifurcated part d6 and the second driven plate d4, and are structured so that driving force can be transferred to the drive device input shaft I1 while absorbing rotary vibration transmitted from the engine output shaft O1 by the damper springs d5.

Here, as can be seen from FIG. 2, the bifurcated part d6 of the damper D has a radial length selected to be relatively short, and there is adopted a structure such that on an outside diameter side thereof, a part of the above-described partition wall SW is positioned.

As a result, a part of the damper D (part of the bifurcated part d6) and respective parts of the partition wall SW and the stator m3 of the rotary electrical machine MG overlap in the axial direction, and by the latter being disposed on the outside diameter side of the former, the length of the drive device in a forward/backward direction can be made shorter.

Drive Device Input Shaft

The drive device input shaft I1 is a substantial input member of the hybrid drive device HV according to an exemplary embodiment of this application, and as shown above, the rotary drive generated by the engine EG is transferred to the drive device input shaft I1 with rotary vibration thereof being absorbed. To explain the relationship with the rotary electrical machine MG, the clutch C and the transmission input shaft I2 (that is an intermediate shaft in this application), the rotary electrical machine MG, the clutch C as well as the drive device input shaft I1 and the transmission input shaft I2 are concentric (this axial center is called a first axial center Z1). Further, as shown in FIG. 2, on a transmission side edge of the drive device input shaft I1, there is adopted a structure to allow entrance of the transmission input shaft I2, and the both are structured to be able to rotate relative to one another.

A clutch drum coupling part i1 is provided in the vicinity of the output end of the drive device input shaft I1, and a clutch drum c1 having a plurality of friction counterpart plates p1 on a tip portion of an outside diameter side is coupled to the drive device input shaft I1 and is structured to rotate integrally with the input shaft I1.

Rotary Electrical Machine

As is well known, the rotary electrical machine MG is constituted of a rotor m1 and a stator m3 having a coil m2. The rotor m1 has a large number of laminates m4 in each of which a permanent magnet is embedded, and a rotor support member RS fixing and supporting these laminates m4 in the axial direction.

Further, a large number of stator cores m6 are fixed on the rotary electrical machine case H1 via the partition wall SW so as to face the laminates m4 with a small gap intervening therebetween, and the coil m2 is wound on these stator cores m6 to form the stator m3.

With respect to the support structure of the rotor m1, the rotor support member RS is structured including an input shaft side radially extending part r1 having an inside diameter side portion supported rotatably by the drive device input shaft I1 and extending in a radial direction, and an intermediate shaft side radially extending part r2 having an inside diameter side portion coupled to the transmission input shaft I2 and extending in a radial direction. Further, the rotor support member RS includes a coupling part r3 coupling outside diameter sides of the input shaft side radially extending part r1 and the intermediate shaft side radially extending part r2 in the axial direction. Then the laminates m4 are coupled to and supported on an outside diameter portion of the coupling part r3.

For the rotor support member RS, there is adopted a structure which is relatively rotatable as a whole with the drive device input shaft I1, and which is spline coupled to the transmission input shaft I2 to rotate integrally therewith. Therefore, rotation of the rotary electrical machine MG is transferred to the transmission input shaft I2.

About support for the rotor support member RS, there is adopted a structure supported by the first rotary shaft bearing B1 fixed to the partition wall SW regarding the engine side of the drive device input shaft I1, and supported by the second rotary shaft bearing B2 and the third rotary shaft bearing B3 provided to interpose with respect to the fixing member F regarding the transmission shaft side of the drive device input shaft I1.

A resolver stator Rs is provided on the partition wall SW, and a resolver rotor Rr is provided on the input shaft side radially extending part r1, and a resolver R is formed by both the Rs, Rr so that the rotary position of the rotary electrical machine MG can be detected.

Now, regarding the oil injected from the above-described pump, there is adopted a structure to use the oil to also cool this rotary electrical machine. In this structure, the oil is guided to the second space with high oil tightness via an oil path (not shown) forming a cooling oil supply mechanism. The oil gathers in a bottom part thereof, circulates further in the space with rotation of the rotary electrical machine MG, and thereby serves to cool the rotary electrical machine MG In the hybrid drive device HV according to an exemplary embodiment of this application, contact of the partition wall SW with the inner surface of the rotary electrical machine case H1 can be performed at the step portion e1 and the cylindrical portion w1, and thus the aforementioned circulation of the cooling oil can be performed favorably.

Drive Transfer from the Rotary Electrical Machine and the Drive Device Input Shaft to the Transmission Input Shaft As has been explained above, in the hybrid drive device HV according to this application, rotation of the rotor of the rotary electrical machine MG is transferred directly to the transmission input shaft I2. On the other hand, between the drive device input shaft I1 and the transmission input shaft I2, there is provided the clutch C which can connect/disconnect drive transfer therebetween. Then, it is structured such that a part of the rotor support member RS works as the clutch hub c2 of the clutch C.

Clutch

As shown in FIG. 2, regarding the rotor support member RS, the clutch drum c1 coupled to the drive device input shaft I1 is allowed to enter the inside space surrounded by the input shaft side radially extending part r1, the intermediate shaft side radially extending part r2 and the coupling part r3, which have been already explained, and the intermediate shaft side radially extending part r2 of the rotor support member RS is structured as the clutch hub c2 therein. Further, a piston c3 is disposed between the clutch drum c1 and the clutch hub c2, and the friction counterpart plates p1 are provided to spline engage with the clutch drum c1, and friction plates p2 are provided to spline engage with the coupling part r3, which is also part of the clutch hub c2, respectively. Thus, it is structured such that engagement/disengagement of the clutch C can be realized by moving the piston c3 in the axial direction by oil pressure. In this example, to realize the engagement state, as shown by the arrow, operating oil for engagement is supplied to a back face side (transmission side) of the piston c3 via an oil passage i2 bored in the transmission input shaft I2, and the piston c3 moves toward the engine side against biasing force of a return spring c4. On the other hand, disengagement of the clutch C is realized by being moved in a direction inverse to the above by releasing of the oil pressure from the oil passage.

As explained above, in this hybrid drive device HV, there is adopted a structure in which the drive device input shaft I1, the transmission input shaft I2, and the rotary electrical machine MG are concentric (first axial center Z1), and further rotation of the rotary electrical machine MG is transferred directly to the transmission input shaft I2. Further, a part of the rotor support member RS forming the rotor m1 of the rotary electrical machine MG and an inside portion thereof are used to form the clutch C.

Arrangement of the Partition Wall, the Rotary Electrical Machine and the Clutch

As can be seen from FIG. 2, for the partition wall SW fixed to the rotary electrical machine case H1, there is adopted a structure in which an outside diameter side thereof is positioned on the engine side (input end side of the drive device input shaft), and an inside diameter side thereof is positioned on the transmission side (output end side of the drive device input shaft). Then, in the space obtained by positioning the outside diameter side of the partition wall SW on the engine side, portions (engine side portions) of the stator m3 and the rotor m1 of the rotary electrical machine MG are disposed.

Therefore, an inside diameter side portion of the partition wall SW and the portions of the stator m3 and the rotor m1 are in a positional relationship to overlap in the axial direction, and are structured so that the portions of the stator m3 and the rotor m1 are located on the outside diameter side with respect to the inside diameter side portion of the partition wall SW.

Further, as can be seen from FIG. 2, the clutch C is provided substantially inside the rotor support member RS and at an inside diameter side position thereof. Therefore, the clutch C and portions (transmission side portions) of the stator m3 and the rotor m1 are in a positional relationship to overlap in the axial direction, and are structured so that the portions of the stator m3 and the rotor m1 are positioned on an outside diameter side with respect to the clutch C.

Further, an outside diameter end position in the radial direction of the inside diameter side portion of the partition wall SW positioned on the transmission side is located almost at outside diameter end positions in the radial direction of the friction plates p2 and the friction counterpart plates p1 of the clutch C. Accordingly, well-balanced arrangement of the inside diameter side portions of the rotary electrical machine MG, the clutch C and the partition wall SW and the bifurcated part d6 of the damper D is realized, and moreover, the length of the device in the forward/backward direction can be shortened adequately.

As explained above, in the rotor support member RS, there is adopted a structure such that the part thereof works as the clutch hub c2. In the clutch hub c2, the inside diameter side portion is located closer to the engine side in a motive power transferring path than the outside diameter side portion thereof and at least a portion of the friction plates p2 and the friction counterpart plates p1, which are disposed closer to the transmission side in the motive power transferring path. Thus, the substantial engagement function parts (friction plates p2 and friction counterpart plates p1) of the clutch C are located on a side closer to the transmission in the motive power transferring path than the inside diameter side portion of the clutch hub c2. With such a structure, shortening in the axial direction is realized, while supporting the rotor support member RS by the fixing member F from the outside diameter side.

Transmission

For the transmission SC, a publicly-known stepped transmission or a continuously variable transmission can be adopted. Shown is an example of a transmission shifting input rotation inputted from the transmission input member (transmission input shaft I2 as explained hitherto) with six speeds and outputs it from a transmission output member. In this example, for the transmission output member, a transmission output gear OG provided on an intermediate portion in the axial direction (leftward/rightward direction in FIG. 1) of the transmission SC is adopted. This transmission output gear OG is meshed with the counter gear CG on the counter shaft A1. Then a pinion P provided on the counter shaft A1 meshes with a differential ring gear RG of the differential gear DG Adopting this structure, drive is transferred to the driving wheels W via the differential gear DG and an axle DS. As shown in FIG. 1, this differential gear DG is supported from both the rotary electrical machine case H1 and the transmission case H2, as shown in FIG. 1.

FIG. 4 shows a positional relationship among the drive device input shaft I1 provided concentrically with the output shaft O1 of the engine OG, and the counter shaft A1 and the differential gear DG, provided at positions which are different from the input shaft I1 and from each other, respectively. This is a view seen from the left side of FIG. 1.

In this view, together with the first axial center Z1 as explained previously, the axial center of the counter shaft A1 is shown as a second axial center Z2, and the axial center of the differential ring gear RG on which the axle DS is disposed is shown as a third axial center Z3. As can be seen from the view, the hybrid drive device HV according to this application is structured compactly regarding a vertical direction width besides the forward/backward direction of the drive device shown in FIGS. 1 and 2.

Other Embodiments

In the above embodiment, an example that the transmission is the stepped transmission SC is shown, but the structure of this application can be applied as a transmission to the case by using a continuously variable transmission, in which the transmission gear ratio changes continuously.

The above-described embodiment shows an example of adopting the hybrid drive device according to this application in an FF (front engine-front wheel drive) layout vehicle, but this drive device can be applied to an FR (front engine-rear wheel drive) layout vehicle as well.

In the above embodiment, the clutch hub c2 of the clutch C which connects/disconnects drive transfer between the engine and the transmission input shaft is used in common with the rotor support member RS. However, the input system on the engine side from the engine EG to the transmission input shaft I2 via the clutch C and the input system from the rotary electrical machine MG to the transmission input shaft I2 may be separate systems up to the transmission input shaft.

A hybrid drive device can be obtained, in which a transmission is supported by a rotary electrical machine case provided on an engine side, and by which the rotary electrical machine case as well as the entire device can have a relatively simple exterior shape and can be made compactly.

What is claimed is:

1. A hybrid drive device, comprising
   a drive device input shaft coupled to an engine,
   a rotary electrical machine,
   a transmission, which shifts and outputs rotary drive force transferred from at least one of the rotary electrical machine and the drive device input,
   a transmission case accommodating the transmission,
   a rotary electrical machine case having a joint surface joined to the transmission case,
   a step portion having a reduced diameter as compared to a portion of the rotary electric machine case located closer to an input end side of the drive device input shaft when seen from the input end side, is provided in an inner peripheral portion of the rotary electrical machine case,
   a partition wall through which the drive device input shaft penetrates and which supports the rotary electrical machine from the input shaft input end side,
   a differential gear having an axis that is different from an axis of the rotary electrical machine, and
   a stator of the rotary electrical machine is fixed to the partition wall,
   wherein a partition wall/rotary electric machine structure, in which the partition wall and the rotary electrical machine are substantially combined into a unit, is fixed to the step portion,
   wherein the partition wall comprises a cylindrical portion covering the stator from an outer peripheral side and engaging with an inner surface of the rotary electrical machine case and the cylindrical portion of the partition wall has a part which is shorter in a circumferential direction than in an axial direction, and
   wherein a length of the cylindrical portion in the axial direction is shortened in a portion of the cylindrical portion adjacent the differential gear.

2. The hybrid drive device according to claim 1, wherein the rotary electrical machine case and partition wall form an oil-tight space nearer to a transmission side, opposite the input end side, than the partition wall,
   wherein a cooling oil supply mechanism which supplies oil to cool the rotary electrical machine is provided therein.

3. The hybrid drive device according to claim 2, further comprising:
   a transmission input shaft concentric with the drive device input shaft,
   a counter shaft, which receives transmission output and which has an axial center different from the transmission input shaft, and
   a differential gear, which receives output from the counter shaft,
   wherein the differential gear is supported by both the transmission case and the rotary electrical machine case, said transmission case and rotary electrical machine case forming a single case.

4. The hybrid drive device according to claim 1, further comprising
   a transmission input shaft concentric with the drive device input shaft,
   a counter shaft, which receives transmission output and which has an axial center different from the transmission input shaft, and
   a differential gear, which receives output from the counter shaft,
   wherein the differential gear is supported by both the transmission case and the rotary electrical machine case, said transmission case and rotary electrical machine case forming a single case.

5. The hybrid drive device according to claim 1, wherein a rotor support member supporting a rotor of the rotary electrical machine comprises:
   an input shaft side radially extending part having an inside diameter side portion rotatably supported by the drive device input shaft and extending in a radial direction;
   an intermediate shaft side radially extending part having an inside diameter side portion coupled to a transmission input shaft as an intermediate shaft and extending in a radial direction; and
   a coupling part coupling outside diameter sides of the input shaft side radially extending part and the intermediate shaft side radially extending part in an axial direction,
   wherein laminates comprising the rotor are provided on an outside diameter portion of the coupling part.

6. The hybrid drive device according to claim 5, wherein a clutch drum coupled to the drive device input shaft enters an inside space surrounded by the input shaft side radially extending part, the intermediate shaft side radially extending part and the coupling part,
   wherein the intermediate shaft side radially extending part is structured as a clutch hub, and
   wherein a friction plate and a piston are disposed between the clutch drum and the clutch hub so as to form a clutch which engages/disengages drive transfer from the drive device input shaft to the transmission.

7. The hybrid drive device according to claim 6, wherein a part of the rotary electrical machine is disposed at an outside diameter side position overlapping in an axial direction the clutch.

8. The hybrid drive device according to claim 5, wherein a fixing member different from the partition wall is provided on a transmission side opposite the input end side from the partition wall, and the rotor support member is supported at one side by a first rotary bearing fixed to the partition wall, and is supported at another side by a rotary shaft bearing provided between the rotor support member and the fixing member.

9. The hybrid drive device according to claim 1, further comprising a damper, which absorbs rotary vibration of the engine and which transfers motive power to the drive device input shaft, wherein an outside diameter side portion of the partition wall, which accommodates a part of the rotary electrical machine, is disposed at an outside diameter side position overlapping in an axial direction a part of an inside diameter side portion of the damper.

10. The hybrid drive device according to claim 1, wherein an oil-tight space is formed by the rotary electrical machine case and the partition wall nearer to a transmission side, opposite the input end side, than the partition wall, and a cooling oil supply mechanism, which supplies oil to cool the rotary electrical machine is provided therein.

11. The hybrid drive device according to claim 10, further comprising:

a transmission input shaft concentric with the drive device input shaft, a counter shaft, which receives transmission output and which has an axial center different from the transmission input shaft, and a differential gear, which receives output from the counter shaft, wherein the differential gear is supported by both the transmission case and the rotary electrical machine case, said transmission case and rotary electrical machine case forming a single case.

12. The hybrid drive device according to claim 11, wherein a rotor support member which supports a rotor of the rotary electrical machine comprises:

an input shaft side radially extending part having an inside diameter side portion rotatably supported by the drive device input shaft and extending in a radial direction;

an intermediate shaft side radially extending part having an inside diameter side portion coupled to a transmission input shaft as an intermediate shaft and extending in a radial direction; and a coupling part coupling outside diameter sides of the input shaft side radially extending part and the intermediate shaft side radially extending part in an axial direction, wherein laminates comprising the rotor are provided on an outside diameter portion of the coupling part.

13. The hybrid drive device according to claim 12, wherein a clutch drum coupled to the drive device input shaft enters an inside space surrounded by the input shaft side radially extending part, the intermediate shaft side radially extending part and the coupling part, wherein the intermediate shaft side radially extending part is structured as a clutch hub, and wherein a friction plate and a piston are disposed between the clutch drum and the clutch hub so as to form a clutch which engages/disengages drive transfer from the drive device input shaft to the transmission.

14. The hybrid drive device according to claim 13, wherein a fixing member different from the partition wall is provided on a transmission side opposite the input end side from the partition wall, and the rotor support member is supported at one side by a first rotary bearing fixed to the partition wall, and supported at another side by a rotary shaft bearing provided between the rotor support member and the fixing member.

15. The hybrid drive device according to claim 1, wherein the rotary electrical machine case and the partition wall form an oil-tight space on a side nearer a transmission side, opposite the input end side, than the partition wall, and a cooling oil supply mechanism, which supplies oil to cool the rotary electrical machine is provided therein.

16. The hybrid drive device according to claim 15, further comprising:

a transmission input shaft concentric with the drive device input shaft, a counter shaft which receives transmission output and which has an axial center different from the transmission input shaft, and a differential gear, which receives output from the counter shaft, wherein the differential gear is supported by both the transmission case and the rotary electrical machine case, said transmission case and rotary electrical machine case forming a single case.

17. The hybrid drive device according to claim 1, further comprising:

a transmission input shaft concentric with the drive device input shaft, a counter shaft, which receives transmission output and which has an axial center different from the transmission input shaft, and a differential gear, which receives output from the counter shaft, wherein the differential gear is supported by both the transmission case and the rotary electrical machine case, said transmission case and rotary electrical machine case forming a single case.

18. The hybrid drive device according to claim 1, further comprising:

a transmission input shaft concentric with the drive device input shaft, a counter shaft, which receives transmission output and which has an axial center different from the transmission input shaft, and a differential gear receiving output from the counter shaft, wherein the differential gear is supported by both the transmission case and the rotary electrical machine case, said transmission case and rotary electrical machine case forming a single case.

19. The hybrid drive device according to claim 1, wherein the stator and the partition wall are fixed by a first bolt from the transmission side to the partition wall, and partition wall/rotary electric machine structure and the step portion are fixed by a second bolt from the engine side to the partition wall.

* * * * *